Jan. 4, 1966      K. ZIEBART      3,227,575
RUSTPROOFING OF THE BODIES OF AUTOMOTIVE VEHICLES
Filed Feb. 18, 1963      3 Sheets-Sheet 1
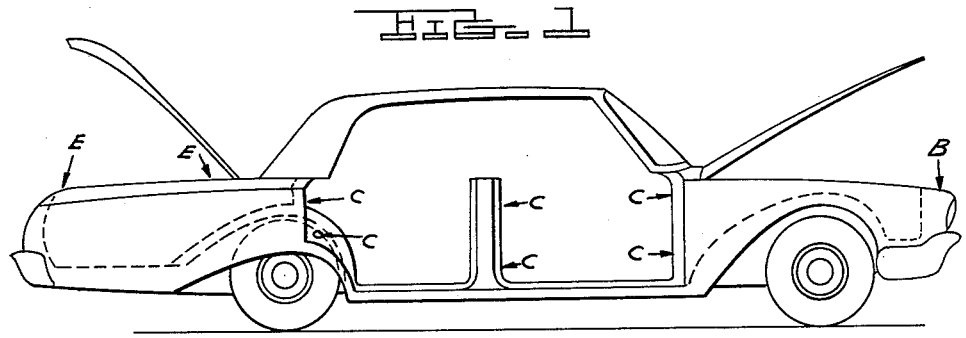
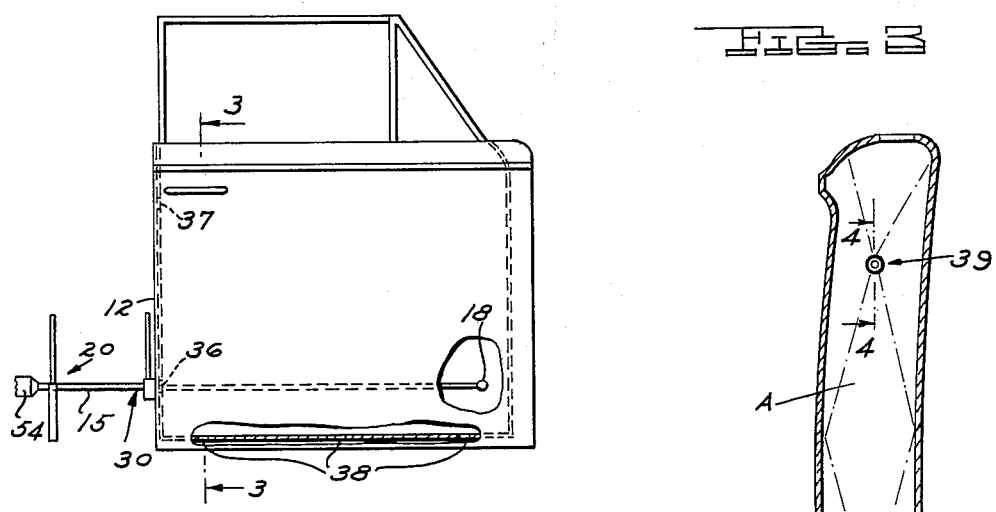
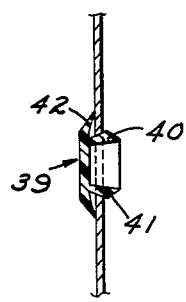
INVENTOR.
KURT ZIEBART
BY
Barnes, Kisselle, Raisch & Choate
ATTORNEYS

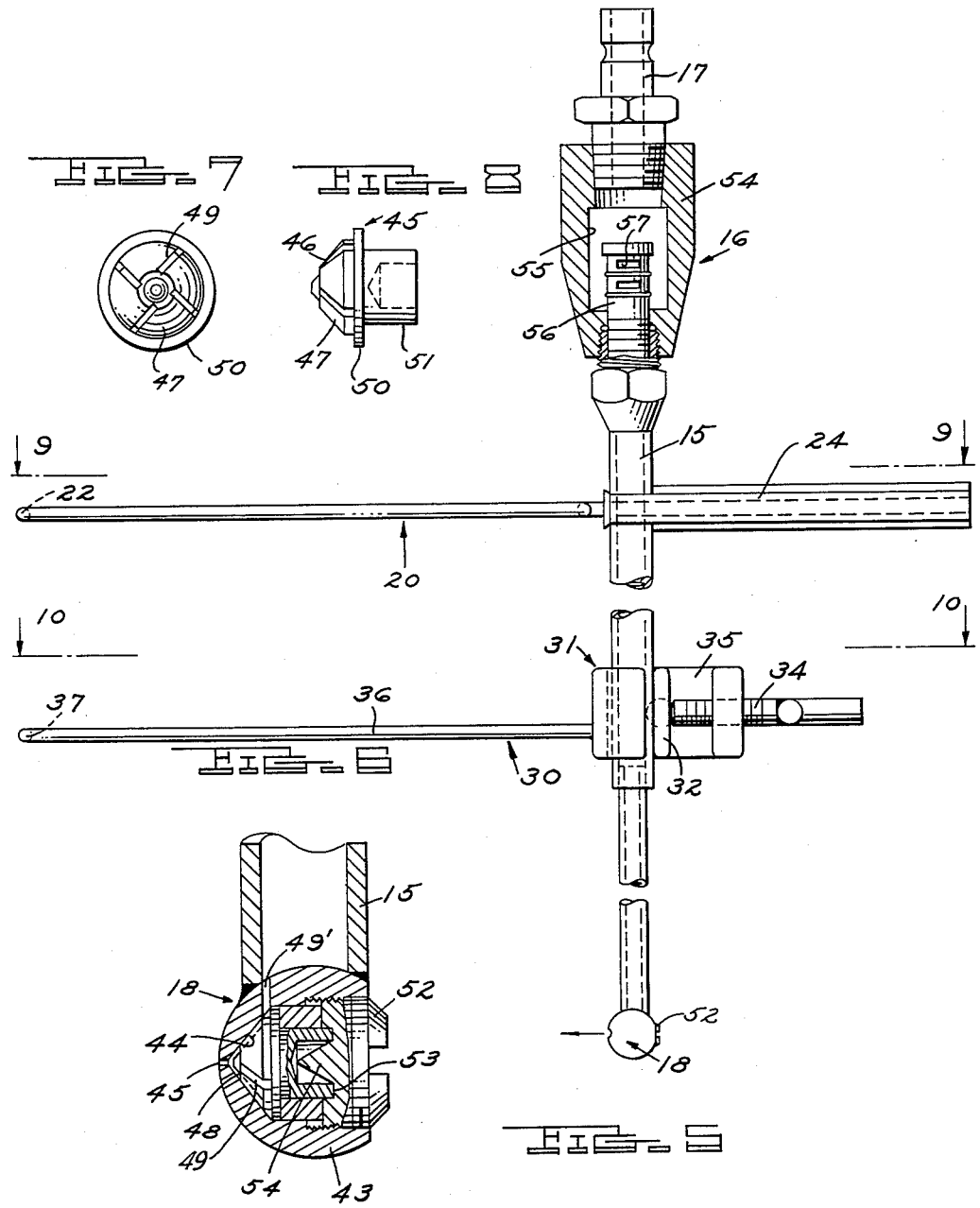

Jan. 4, 1966 K. ZIEBART 3,227,575
RUSTPROOFING OF THE BODIES OF AUTOMOTIVE VEHICLES
Filed Feb. 18, 1963 3 Sheets-Sheet 3

INVENTOR.
KURT ZIEBART
BY
Barnes, Kisselle, Raisch & Choate
ATTORNEYS

United States Patent Office
3,227,575
Patented Jan. 4, 1966

3,227,575
RUSTPROOFING OF THE BODIES OF
AUTOMOTIVE VEHICLES
Kurt Ziebart, Detroit, Mich., assignor, by mesne assignments, to Ziebart Process Corporation, Detroit, Mich., a corporation of Michigan
Filed Feb. 18, 1963, Ser. No. 259,101
4 Claims. (Cl. 117—49)

This invention relates to rustproofing the bodies of automotive vehicles and the like and particularly to rustproofing the relatively inaccessible hollow areas of the the body of the vehicle.

In recent years, it has become customary to provide an asphaltic coating on the undersurfaces of the automotive vehicle to prevent corrosion which occurs from moisture, salt and other materials with which the vehicle comes in contact in normal use. Such asphaltic coatings are relatively brittle and it has been found that they tend to peal or break away from the surfaces of the vehicle permitting moisture to enter between the coating and the vehicle and accelerate rather than minimize the corrosion. The further problem with such coatings is that it has not heretofore been economical or practical to apply any coating to the relatively inaccessible hollow areas of the vehicle where corrosion tends to begin. Such areas are the interiors of doors, the areas under the hood adjacent the headlights, the areas under the trunk lid, and the areas within and adjacent to the door openings.

It is an object of this invention to provide a method and apparatus whereby the relatively inaccessible areas of an automotive vehicle can be quickly, thoroughly and economically coated with a rustproofing material.

It is a further object of the invention to provide a rustproofing material which obviates the disadvantages of the asphaltic coatings heretofore used.

In the drawings:

FIG. 1 is a partly diagrammatic elevational view of a vehicle, parts being broken away, which is utilized to describe the method.

FIG. 2 is a part sectional partly diagrammatic view of a door of an automotive vehicle showing the manner in which it is treated in accordance with the invention.

FIG. 3 is a fragmentary sectional view on an enlarged scale taken along the line 3—3 in FIG. 2.

FIG. 4 is a fragmentary sectional view on an enlarged scale taken along the line 4—4 in FIG. 3.

FIG. 5 is a part sectional fragmentary view of the apparatus embodying the invention.

FIG. 6 is a fragmentary sectional view on an enlarged scale of the nozzle portion of the apparatus.

FIG. 7 is an end view of a distributor member utilized in the nozzle.

FIG. 8 is a side elevational view of the distributor member shown in FIG. 7.

Figure 9:
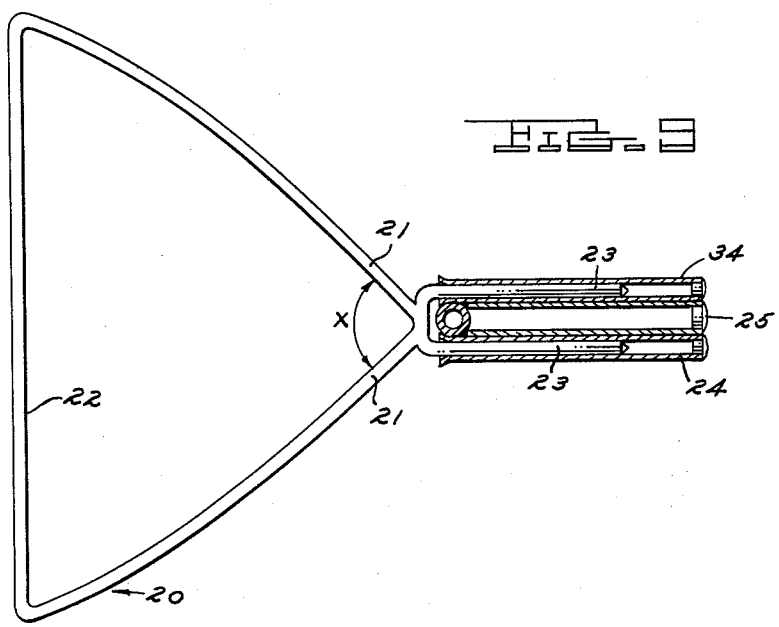
FIG. 9 is a sectional view taken along the line 9—9 in FIG. 5.
Figure 10:
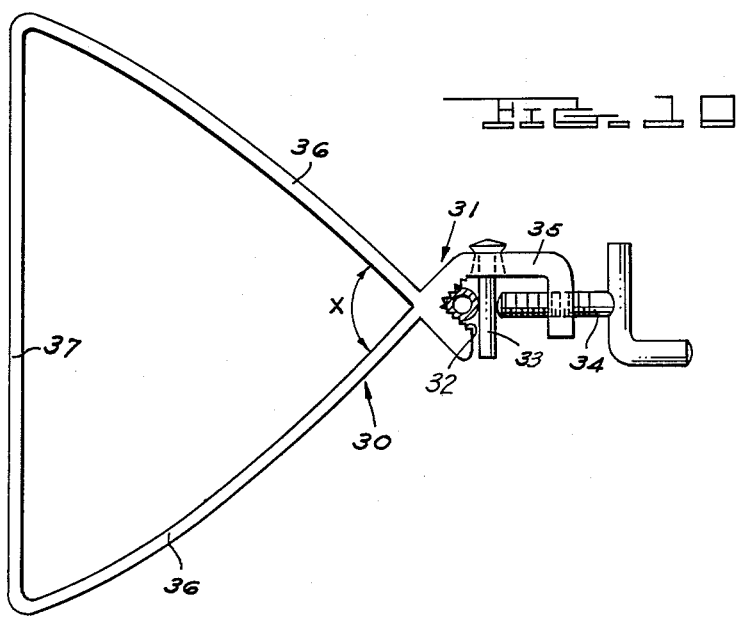
FIG. 10 is a sectional view taken along the line 10—10 in FIG. 5.

Referring to FIGS. 1 and 2, an automotive vehicle such as a passenger car or a truck, being made of steel, is subject to corrosion when subjected to moisture, road salt and other similar materials. In addition to the underside of the body including beneath the fenders, the moisture tends to enter and collect in other areas which heretofore have not been treated because of their relative inaccessibility and the relative cost of treating them. Such areas comprise the interior A of the door 12, the hollow area B adjacent the headlight of the vehicle, the hollow areas C adjacent the door openings, and the hollow areas E under the trunk lid and adjacent the juncture of the rear fenders with the body. These hollow areas are representative of those that occur in automotive vehicles. In some vehicles, the areas are more numerous than others depending upon the design.

According to the invention, a novel apparatus is utilized to introduce a novel rustproofing material in spray form through openings into the hollow areas. The material is applied in a systematic manner to insure complete coating of the area quickly and with a minimum of labor. This is facilitated by the apparatus that is used.

As shown in FIG. 5, the apparatus that is used comprises a tube 15 on one end of which a filter unit 16 and a disconnectable fitting 17 are provided so that the tube 15 can be attached to a source of rustproofing material under pressure. A nozzle 18 is fixed on the other end of the tube 15 and is adapted to direct a substantially conical spray laterally and radially outwardly in the direction of the arrow as shown in FIG. 5. The length of the tube 15 is such that the tube can be introduced through openings in the body of the automotive vehicle as may be required to entirely coat an area as presently described. Thus, in order to coat the interior of a door, the tube may be on the order of 36 inches or more in length.

Referring to FIGS. 5 and 9, an indicator device 20 is fixed on the tube 15. The device 20 is made of wire and comprises spaced generally radially extending elements 21 having the outer ends thereof joined by wire element 22. The indicator device 20 further includes a pair of legs 23 which are telescoped and press fitted into tubes 24 which are fixed on tube 15. An additional tube 25 is fixed between the tubes 24 and cooperates with the tubes 24 to form a handle.

The angle X between the elements 21 is substantially equal to the angle of the spray emanating from the nozzle 18 so that the indicator device 20 at all times indicates the general direction and angular extent of the spray emanating from the nozzle 18. This enables the operator to introduce the tube 15 into an opening and know by observing the indicator 20 the direction of the nozzle without being able to observe the nozzle.

In order to facilitate the operator in aligning the axis of the tube 15 through the opening and to serve as a stop for limiting the extent of movement of a tube through an opening, an alignment device 30 is adjustably mounted on the tube 15. The device 30 comprises a bracket 31 having toothed surfaces 32 and a pivoted plate member 33 thereon. A crank 34 is threaded into portion 35 of the bracket and forces the plate 33 toward the surface 32 to lock the bracket 31 and, in turn, the indicator on the tube 15. The alignment device is made of wire and comprises spaced generally radially extending elements 36 having the outer ends thereof joined by a wire element 37. The angle X between elements 36 is substantially equal to the angle of the spray emanating from the nozzle 18 so that the indicator 20 when aligned with the nozzle 18 will indicate the general direction and angular extent of the spray emanating from the nozzle 18.

The indicator device is adjusted longitudinally on the tube 15 in accordance with the length or width of the inaccessible area which is to be coated so that the device 20 will also serve as a stop and limit the inward movement of the tube and, in turn, the nozzle 18 through an access opening.

In practice, the indicator device 20 is always extending in such a manner as to indicate the angle of the spray 18 relative to the tube. The device 30 is aligned with the device 20 longitudinally on the tube and in such a position that the distance between the nozzle 18 and the device 20 corresponds to the length or width of the space to be coated. Thus, as shown in FIG. 4, the device 30 is positioned on the tube in such a manner that the nozzle 18 is adjacent the furthermost point of the interior A of the door 12 from the access opening.

In use, openings are drilled at appropriate points in the vehicle body to provide access to the relatively inaccessible areas. Thus, in the door shown in FIG. 2, openings are drilled at 36, 37. The member 30 is adjusted in proper relationship on the tube and the tube with the nozzle is inserted through the opening 36 with the indicator device 20 and alignment device 30 extending in a particular direction as shown in FIG. 3.

The nozzle is then moved axially of the opening 36 to coat a longitudinal portion corresponding in angular extent generally to the angular extent of the spray. The tube 15 is then rotated moving the devices 20 and 30 in such a manner that the next circumferential portion of the space is coated. In other words, the operator observes the edge of the devices 20, 30 and then rotates the tube 15 in such a manner that the legs of the devices 20, 30 define or circumscribe a new longitudinal and angular portion which is then coated by moving the tube axially of the opening 36. A similar procedure is followed in each of the enclosed areas of the vehicle. Holes are drilled at areas B, C and E and the interior of the areas is sprayed, the use of the devices 20 and 30 insuring a complete spray with a minimum of skill required.

After the areas are coated, all openings which are not drain openings such as the drain openings 38 (FIG. 2) are closed by means of a plastic cap 39 such as shown in FIG. 4 which comprises a tubular portion 40 having a beveled outer surface 41 that snaps into the opening and a retaining flange 42 that cooperates with the beveled surface 41 to retain the cap in the opening.

Referring to FIGS. 5–8, the nozzle 18 comprises a nozzle body 43 which is generally spherical and fixed on the lower end of the tube 15. The nozzle body is hollow and includes a conical surface 44 that has its apex communicating with the outlet 45 of the nozzle. A distributor member 46 includes a frusto-conical surface 47 that contacts the conical surface 44 of the body 43 but has its end spaced from the apex thereof to define a space 48. Straight grooves 49 extend along the space of the surface 47 to the apex thereof and a passage 49′ in the body 43 provides communication between the tube 15 and the grooves 49. In this manner, rustproofing material under pressure passes from the tube 15 through passage 49′, grooves 49 to the space 48 in generally tangential manner so that a whirling motion is provided to the material and it issues out of the discharge opening 45 as a spray. The distributor also includes a peripheral flange 50 and a tubular end portion 51. The distributor 45 is held in position in the body by a retaining member 52 which is threaded into the body and includes a seat 53 that engages the end of the tubular portion 51. A conical projection 54 helps align and seat the distributor member 46. In this manner, the distributor member can be readily removed to permit access for cleaning.

Filter unit 16 shown in FIG. 5 not only prevents the entry of dirt and the like into the nozzle assembly but serves as a further safety measure during changing of the disconnectable connection. As shown, the filter assembly 16 comprises a housing 54 having a space 55 therein and a member 56 including spaced openings 57 that serve to filter the materials.

It has been found that the rustproofing material which will produce satisfactory results without the disadvantages of the relatively hard thermo-setting type of asphaltic materials that have been heretofore used comprises material that has the properties as follows:

| Test method: | Specification limits |
|---|---|
| Non-volatile content (MIL-C-16173B) | 58 to 65%. |
| Flow point (MIL-C-16173B) | 175° F. min. |
| Sulfated residue (Fed. Standard 791) (No. 5611) | 5.3% min. |
| Tackiness (MIL-C-I6173B) | Dry to touch in 4 hours and tack free after 24 hours. |
| Salt spray protection (Fed. Standard 791) (No. 4001) | 30 days, min. (polished steel panels). |
| Humidity cabinet protection (JAN-H-792) | 30 days, min. (polished steel panels). |

A representative example of such a material comprises the following composition by weight:

| | |
|---|---|
| Tectyl 400 (Valvoline Co.) | ½ |
| Texaco rustproofing compound L | ½ |
| Staclene solvent (Staclene Oil Co., Detroit) | ⅓ |

It can thus be seen that there has been provided a novel method, apparatus and composition for quickly, thoroughly and economically rustproofing bodies of automotive vehicles.

I claim:
1. The method of rustproofing an automotive vehicle which comprises the steps of
   forming openings in portions of the body of the automotive vehicle to provide access to the relatively inaccessible hollow areas of the body,
   inserting a nozzle into said openings extending to relatively inaccessible hollow areas in the body of the automotive vehicle,
   continuously supplying a rustproofing material to said nozzle to direct a spray laterally therefrom,
   moving said nozzle axially through each opening and successively rotating the nozzle generally about the axis of said opening to coat the entire inaccessible hollow area.

2. The method set forth in claim 1 including the step of closing at least some of said openings which have their axes extending other than vertical to prevent the ingress of moisture.

3. The method of rustproofing an automotive vehicle which comprises the steps of
   forming openings in portions of the body of the automotive vehicle to provide access to the relatively inaccessible hollow areas of the body,
   inserting a nozzle successively into each of the openings,
   said nozzle being of the type which has its spray opening extending laterally,
   supplying rustproofing material to the nozzle to direct a spray laterally therefrom,
   moving the nozzle axially of the opening without rotation to coat one longitudinally extending portion of the enclosed area,
   and successively indexing the nozzle generally about the axis of said opening and moving it axially to successively coat additional circumferential portions of the hollow area.

4. The method of rustproofing an automotive vehicle which comprises the steps of
   forming openings under the hood, adjacent the headlight area and at the door closure area of the body of the automotive vehicle to provide access to the relatively inaccessible hollow areas of the body, inserting a nozzle successively into each of the openings,
said nozzle being of the type which has its spray opening extending laterally,
supplying a rustproofing material to the nozzle to direct a spray laterally therefrom,
moving the nozzle axially of the opening without rotation to coat one longitudinally extending portion of the enclosed area,
and successively indexing the nozzle generally about the axis of said opening and moving it axially to successively coat additional circumferential portions of the hollow area.

References Cited by the Examiner
UNITED STATES PATENTS

| 1,126,707 | 2/1915 | Coles | 239—73 |
| 1,996,747 | 4/1935 | Butterworth | 117—96 |
| 2,085,765 | 7/1937 | Peters | 117—96 |
| 2,878,068 | 3/1959 | Rienks | 239—73 |

FOREIGN PATENTS

| 511,564 | 8/1939 | Great Britain. |

RICHARD D. NEVIUS, *Primary Examiner.*

JOSEPH B. SPENCER, *Examiner.*